April 3, 1934. G. CAMILLI 1,953,914
TEMPERATURE INDICATOR
Filed April 30, 1931

Inventor:
Guglielmo Camilli,
by Charles E. Mullen
His Attorney.

Patented Apr. 3, 1934

1,953,914

UNITED STATES PATENT OFFICE 1,953,914

TEMPERATURE INDICATOR

Guglielmo Camilli, Pittsfield, Mass., assignor to General Electric Company, a corporation of New York Application April 30, 1931, Serial No. 534,027

2 Claims. (Cl. 73—32)

My invention relates to temperature indicators and more particularly to devices for indicating internal temperatures of electrical induction apparatus such as transformers and reactors. The maximum load capacity of such apparatus is limited by the maximum allowable temperature of the windings, insulation and other internal parts. Some means for indicating the temperature of these parts, particularly when this temperature is at or near its maximum allowable value, is therefore often highly desirable. The current in a conductor, such as one of the leads from a transformer or reactor winding, produces a magnetic field surrounding the conductor. The general object of the invention is to provide an improved instrument which may be influenced by such a magnetic field to indicate internal temperature conditions of the apparatus.

Figure 1:
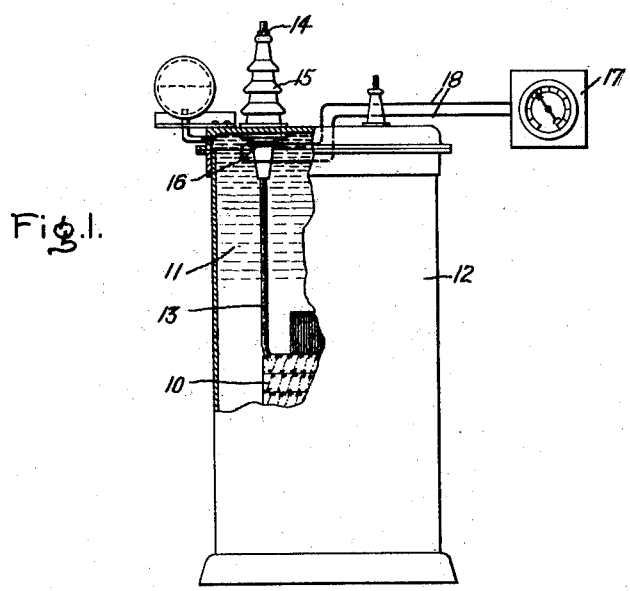
Figure 2:
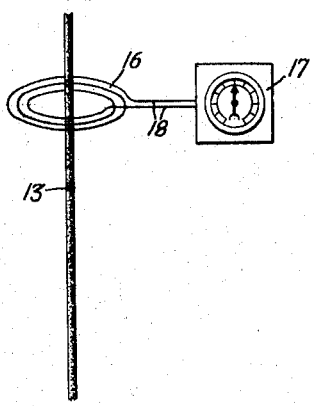

The invention will be better understood from the following description taken in connection with the accompanying drawing in which Fig. 1 shows an indicator constructed and arranged in accordance with the invention as applied to electrical apparatus such as a transformer or reactor and Fig. 2 indicates a modified form of the invention.

Like reference characters indicate similar parts in the different figures of the drawing.

The invention will be explained in connection with the transformer 10 shown in Fig. 1. This transformer is immersed in an insulating liquid 11 within a casing 12. One of the leads 13 extends from a winding of the transformer through the casing 12 to an outside terminal 14, this transformer lead being insulated from the casing by a bushing 15.

The invention may be used in a number of different forms, some of which are indicated in the drawing. In one form, shown in Fig. 1, a ring 16 of one or more turns of magnetic conductive material surrounds the transformer lead 13 so that it is in the magnetic field produced by the current in this lead. The ring 16 is also immersed in the insulating liquid 11 by which it is heated. The ring 16 should have high resistance. When the transformer is in operation, the magnetic field around the lead 13 causes eddy current and hysteresis losses which appear as heat in the ring 16 and this raises the temperature of the ring 16 above that of the surrounding liquid 11. The ring 16 may have a covering of heat insulating material to retard the dissipation of its heat into the liquid. When the transformer is not loaded, the temperature of the ring 16 will be the same as that of the surrounding liquid 11. When the transformer is loaded, the temperature of the ring 16 and the internal temperature of the transformer will each be above that of the liquid 11 by an amount which will increase and decrease with the load.

The ring 16 is formed of some suitable magnetic conductive material such as iron or steel which has a resistance which varies with its temperature. An indicating instrument 17 which is responsive to variations in resistance is connected by conductors 18 to opposite sides of the ring 16 so that two halves of the ring are connected in parallel in the instrument circuit. The current in the lead 13 is necessarily always equal to that in the winding of the transformer 10 although any other arrangement which will maintain a substantially constant proportion or ratio between these two current values will be satisfactory. The internal temperature or hottest part of the transformer 10 is equal to the temperature of the liquid 11 plus an additional temperature due to the losses in the transformer, these losses and therefore this additional temperature being a function of the current in the transformer winding. The temperature of the ring 16 is equal to the temperature of the liquid 11 plus an additional temperature due to the magnetic losses in the ring, those losses being a function of the current in the load 13. The resistance of the ring 16 varies with its temperature and controls the instrument 17 which is graduated to indicate the internal temperature of the transformer. The actual temperature of the ring 16 above that of the liquid 11 depends upon the magnetic characteristics of the material and its volume forming the ring and upon the rate at which the heat is dissipated through the heat insulating material on the ring. These factors may be easily calculated, at least approximately, or the desired results may be attained by trying rings of different characteristics and volume and by increasing or decreasing the amount of heat insulating material on the ring. It is considered preferable to design the ring and the amount of heat insulating material to produce a temperature in the ring equal at all times to the internal temperature of the transformer.

A different form of the ring 16 shown in Fig. 1 is shown in Fig. 2 in which this magnetic element 16 is a conductor of magnetic material forming preferably several turns around the load 13 and connected in series with the leads 18 from the indicating instrument 17. The instrument is responsive to changes in the resistance of the conductor 16 and operates in the same manner as has been described in connection with Fig. 1.

The invention has been explained by describing and illustrating various forms thereof and it will be apparent that further changes may be made without departing from the spirit of the invention and the scope of the appended claims.

What I claim as new and desire to secure by Letters Patent of the United States is:

1. The combination with electrical induction apparatus, of a magnetic conductive member disposed in a magnetic field controlled by a current in said apparatus, said apparatus and member being disposed in a common cooling medium, said member having a resistance variable in response to temperature changes produced by said magnetic field, and an indicating instrument responsive to the resistance variations in said member, said instrument being graduated to indicate internal temperatures of said apparatus.

2. The combination with electrical induction apparatus, of a magnetic conductive member disposed in a magnetic field controlled by a current in said apparatus, said apparatus and member being disposed in a common cooling medium, said member having a resistance variable in response to temperature changes produced by said magnetic field, means for retarding heat dissipation from said magnetic conductive member, and an indicating instrument responsive to the resistance variations in said member, said instrument being graduated to indicate internal temperatures of said apparatus.

GUGLIELMO CAMILLI.